(12) United States Patent
McGann et al.

(10) Patent No.: US 11,172,063 B2
(45) Date of Patent: Nov. 9, 2021

(54) SYSTEM AND METHOD FOR EXTRACTING DOMAIN MODEL FOR DYNAMIC DIALOG CONTROL

(71) Applicant: GENESYS TELECOMMUNICATIONS LABORATORIES, INC., Daly City, CA (US)

(72) Inventors: Conor McGann, San Carlos, CA (US); Ioana Grigoropol, Daly City, CA (US); Mariya Orshansky, Daly City, CA (US); Ankit Pat, Daly, CA (US)

( * ) Notice: Subject to any disclaimer, the term of this patent is extended or adjusted under 35 U.S.C. 154(b) by 49 days.

(21) Appl. No.: 15/986,787

(22) Filed: May 22, 2018

(65) Prior Publication Data

US 2018/0336896 A1 Nov. 22, 2018

Related U.S. Application Data

(60) Provisional application No. 62/509,720, filed on May 22, 2017.

(51) Int. Cl.
*G10L 15/22* (2006.01)
*H04M 3/493* (2006.01)
(Continued)

(52) U.S. Cl.
CPC .......... *H04M 3/4936* (2013.01); *G06F 17/18* (2013.01); *G06N 5/003* (2013.01); *G06N 7/005* (2013.01);
(Continued)

(58) Field of Classification Search
None
See application file for complete search history.

(56) References Cited

U.S. PATENT DOCUMENTS

| 6,505,162 B1 | 1/2003 | Wang et al. |
| 7,076,032 B1 * | 7/2006 | Pirasteh ............... H04M 3/4938 379/265.02 |

(Continued)

FOREIGN PATENT DOCUMENTS

| WO | 0215084 A1 | 2/2002 |
| WO | 200215084 A1 | 2/2002 |
| WO | 2015184186 A1 | 12/2015 |

OTHER PUBLICATIONS

Bordes, Antoine et al.,; Learning End-to-End Goal-Oriented Dialog, Facebook AI Research, New York, USA, Published as a conference paper at ICLR 2017, 15 pages.
(Continued)

*Primary Examiner* — Richard Z Zhu

(57) ABSTRACT

A system and method for engaging in an automated dialog with a user. A processor retrieves a preset dialog flow that includes various blocks directing the dialog with the user. The processor provides a prompt to the user based on a current block of the dialog flow, receives an action from the user in response to the prompt, and retrieves a classification/decision tree corresponding to the dialog flow. The classification tree has a plurality of nodes mapped to the blocks of the dialog flow. Each of the nodes represents a user intent. The processor computes a probability for each of the nodes based on the action from the user. A particular one of the nodes is then selected based on the computed probabilities. A target block of the dialog flow is further identified based on the selected node, and a response is output in response to the identified target block.

9 Claims, 15 Drawing Sheets

(51) Int. Cl.
*G06F 17/18* (2006.01)
*G06N 5/00* (2006.01)
*G06N 7/00* (2006.01)
*G06F 16/332* (2019.01)
*G10L 15/18* (2013.01)

(52) U.S. Cl.
CPC ............ *G10L 15/22* (2013.01); *H04M 3/493* (2013.01); *G06F 16/3329* (2019.01); *G10L 15/18* (2013.01); *G10L 15/1815* (2013.01); *G10L 15/1822* (2013.01); *G10L 2015/225* (2013.01); *H04M 3/4935* (2013.01); *H04M 2203/355* (2013.01); *H04M 2203/556* (2013.01)

(56) References Cited

U.S. PATENT DOCUMENTS

| | | | |
|---|---|---|---|
| 8,265,939 B2* | 9/2012 | Kanevsky | G10L 15/1815 704/275 |
| 8,457,973 B2 | 6/2013 | Blanchard | |
| 8,676,583 B2* | 3/2014 | Gupta | G10L 15/22 704/256 |
| 9,009,046 B1 | 4/2015 | Stewart | |
| 9,037,462 B2 | 5/2015 | Williams | |
| 9,715,496 B1 | 7/2017 | Sapoznik et al. | |
| 9,721,570 B1 | 8/2017 | Beal et al. | |
| 9,922,642 B2* | 3/2018 | Pitschel | G10L 15/063 |
| 10,176,167 B2 | 1/2019 | Evermann | |
| 10,241,752 B2 | 3/2019 | Lemay et al. | |
| 2002/0077815 A1 | 6/2002 | Zhang et al. | |
| 2003/0004722 A1* | 1/2003 | Butzberger | G10L 15/19 704/257 |
| 2004/0249638 A1 | 12/2004 | Wang | |
| 2005/0165607 A1* | 7/2005 | Di Fabbrizio | G06F 40/30 704/256 |
| 2006/0215824 A1* | 9/2006 | Mitby | G10L 15/22 379/100.05 |
| 2012/0053945 A1 | 3/2012 | Gupta et al. | |
| 2012/0265528 A1* | 10/2012 | Gruber | G10L 15/18 704/235 |
| 2013/0339033 A1 | 12/2013 | Agapi et al. | |
| 2015/0039292 A1* | 2/2015 | Suleman | G06F 16/285 704/9 |
| 2015/0154956 A1* | 6/2015 | Brown | G06F 16/353 704/235 |
| 2015/0228275 A1 | 8/2015 | Watanabe et al. | |
| 2015/0235132 A1 | 8/2015 | Allen et al. | |
| 2015/0348549 A1* | 12/2015 | Giuli | G06F 16/3329 704/235 |
| 2015/0356970 A1 | 12/2015 | Shen et al. | |
| 2016/0042735 A1* | 2/2016 | Vibbert | G10L 15/1822 704/257 |
| 2018/0338041 A1 | 11/2018 | McGann et al. | |

OTHER PUBLICATIONS

Brooks, Rodney A., A Robust Layered Control System For A Mobile Robot, IEEE Journal of Robotics and Automation, vol. RA-2, No. 1, Mar. 1986, pp. 14-23; also MIT Al Memo 864, Sep. 1985, 10 pages.
Kuyan, Steven et al., Why is now the time for artificial intelligence?, Venture Beat, Aug. 12, 2016, 3 pages.
Lewis, Charles et al., A Clarification Algorithm for Spoken Dialogue Systems, AT&T Labs—Research, Florham Park, NJ, USA, 2005, 4 pages.
Li, Jiwei et al., Deep Reinforcement Learning for Dialogue Generation, USA, Sep. 29, 2016, 11 pages.
Naumov, Mikhail et al. How AI and messaging are redefining customer service, Venture Beat, 2016, 5 pages.
Wang, Zhuoran et al., A Simple and Generic Belief Tracking Mechanism for the Dialog State Tracking Challenge On the believability of observed information, Interaction Lab, MACS, Heriot-Watt University Edinburgh, United Kingdom, 2013, 10 pages.
Williams, Jason D. et al., The Dialog State Tracking Challenge Series: A Review, Microsoft Research, University of Cambridge, Dialog & Discourse 7(3), 2016, 30 pages.
Wu, Ji et al., A Probabilistic Framework for Representing Dialog Systems and Entropy-Based Dialog Management through Dynamic Stochastic State Evolution, IEEE, Apr. 27, 2015, 11 pages.
International Search Report and Written Opinion for Application No. PCT/US2018/033978, dated Sep. 14, 2018, 12 pages.
EP Examination Report for co-pending EP application 18805659.2 dated Mar. 19, 2020.
Australian Examination Report regarding co-pending application No. 2018273197 dated Aug. 24, 2020.
New Zealand Intellectual Property Office Patent Examination Report No. 1 for corresponding Application No. 759477, dated Aug. 5, 2020, 4 pages.
Canadian Examination Report received for co-pending application No. 3,064,565 dated Feb. 17, 2021.
New Zealand Second Examination Report received for co-pending application No. 759477 dated Feb. 23, 2021.
New Zealand Third Examination Report received for co-pending application No. 759477 dated May 6, 2021.

* cited by examiner

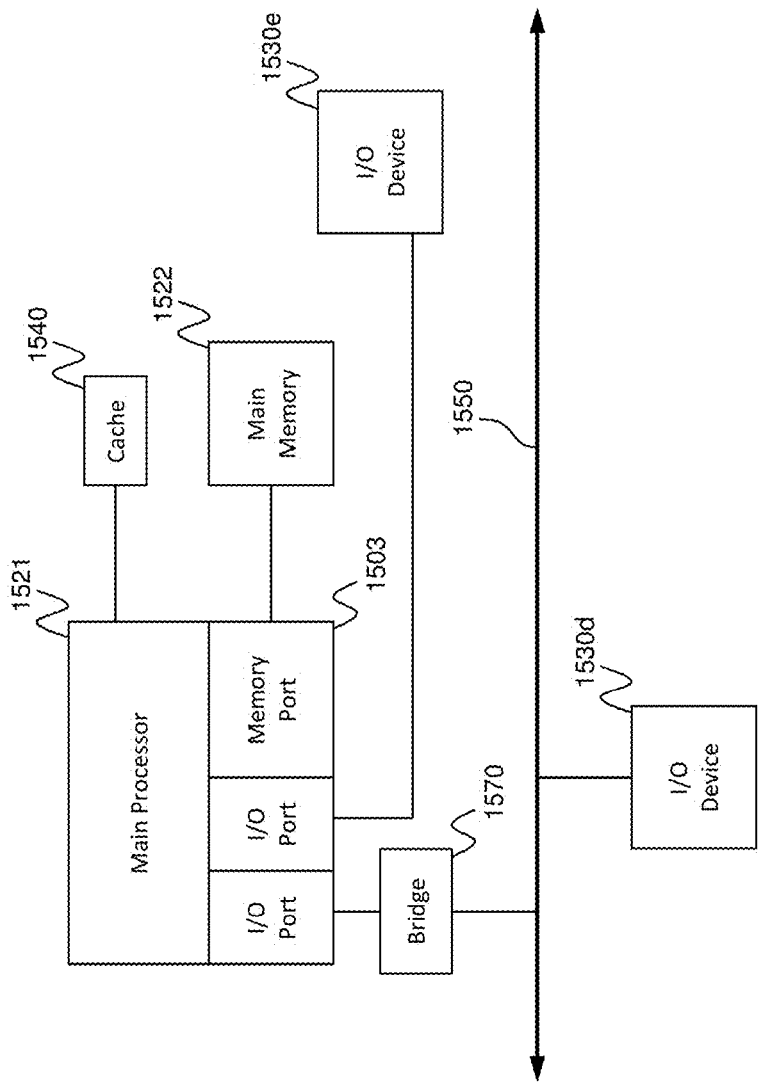

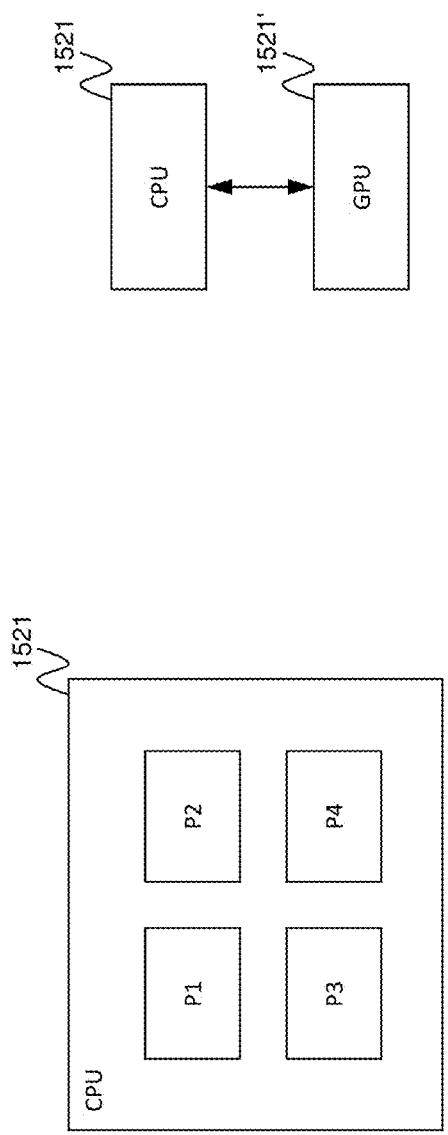

SYSTEM AND METHOD FOR EXTRACTING DOMAIN MODEL FOR DYNAMIC DIALOG CONTROL

CROSS REFERENCE TO RELATED APPLICATION

This application claims the benefit of U.S. Provisional Application No. 62/509,720, filed May 22, 2017, the content of which is incorporated by reference.

This application is also related in U.S. Application entitled "System And Method for Dynamic Dialog Control for Contact Center Systems," filed on even date herewith, the content of which is incorporated herein by reference.

BACKGROUND

Customer contact center systems often employ automated response systems to handle at least a portion of an inbound interaction from a customer. For example, a contact center system may deploy an interactive voice response (IVR) system (including a speech-enabled IVR system) to enable the contact center to collect information about a customer, and determine an appropriate routing strategy, communication path, or execution strategy, for the customer. Such systems may require a customer to navigate through a series of IVR menu options or an automated self-service portal, which enables the contact center to reduce employee or agent overhead. However, this may lead to additional effort on the part of customers, in that such customers must spend time navigating the often lengthy step-by-step menus of the automated system.

Additionally, such systems are typically inflexible and allow customers to traverse one of a finite number of predetermined communication paths or execution strategies. Generally speaking, if a response from the customer is not one of a limited set of responses expected by the system, the system is not able to proceed and the dialog fails. Thus, what is desired is an automated response system that addresses the above issues.

SUMMARY

An embodiment of the present invention is directed to a system and method for automatically extracting and using a domain model for conducting an automated dialog with a user. In this regard, a processor is adapted to read a specification for a dialog flow from a data storage device. The dialog flow has a plurality of blocks organized in a hierarchical structure. The processor extracts metadata from each of the blocks, and selects, based on the extracted metadata, blocks of the dialog flow that are configured to advance a dialog controlled by the dialog flow. Nodes of the domain model are defined based on the selected blocks. The nodes of the domain model and the blocks of the dialog flow are then concurrently traversed for determining an intent of the user. An action is automatically invoked based on the determined intent.

According to one embodiment of the invention, the particular node of the nodes of the domain model is a node indicative of the intent of the user. The particular node may be associated with one or more parameters. Values of the one or more parameters may be identified in response to traversing the nodes of the domain model and the blocks of the dialog flow.

According to one embodiment of the invention, the concurrently traversing the nodes of the domain model and the blocks of the dialog flow for determining an intent of the user includes providing a prompt to the user based on a current block of the plurality of blocks; receiving an action from the user in response to the prompt; computing a probability for each of the nodes of the domain model based on the action from the user, each of the nodes representing a customer intent; selecting a particular node of the nodes based on the computed probabilities; identify a target block of the dialog flow corresponding to the particular node; and output a response in response to the identified target block.

According to one embodiment of the invention, the target block is a block hierarchically below an intermediate block on a path from the current block to the target block, wherein the intermedia block is skipped during the dialog in response to identifying the target block.

According to one embodiment of the invention, the target block is associated with a node of the nodes having a highest probability of the computed probabilities.

According to one embodiment of the invention, the response is a prompt for disambiguating between a plurality of candidate intents. The prompt may change based on the computed probability of a target node of the nodes corresponding to the target block, relative to a threshold associated with the target node. The threshold may be dynamically updated based on response by the user to the prompt.

According to one embodiment of the invention, the probabilities are updated based on response by the user to the prompt.

According to one embodiment of the invention, the action from the user includes a natural language utterance.

According to one embodiment of the invention, the response corresponds to an action identified in the target block.

According to one embodiment of the invention, the probability is computed based on a current probability value and a prior probability value.

As a person of skill in the art should appreciate, the automated response system of the embodiments of the present invention provide improvements to traditional IVR systems by expanding the ability to understand user intent and attempting to proceed with the dialog even if the understanding of the intent is low. Also, instead of progressing with the dialog in a way that strictly follows the dialog script, embodiments of the present invention allow certain prompts to be skipped if user intent is identified with certain confidence early on in the dialog.

BRIEF DESCRIPTION OF THE DRAWINGS

FIG. 9B is a block diagram of a computing device according to an embodiment of the present invention;

FIG. 9C is a block diagram of a computing device according to an embodiment of the present invention;

FIG. 9D is a block diagram of a computing device according to an embodiment of the present invention.

DETAILED DESCRIPTION

Figure 1:
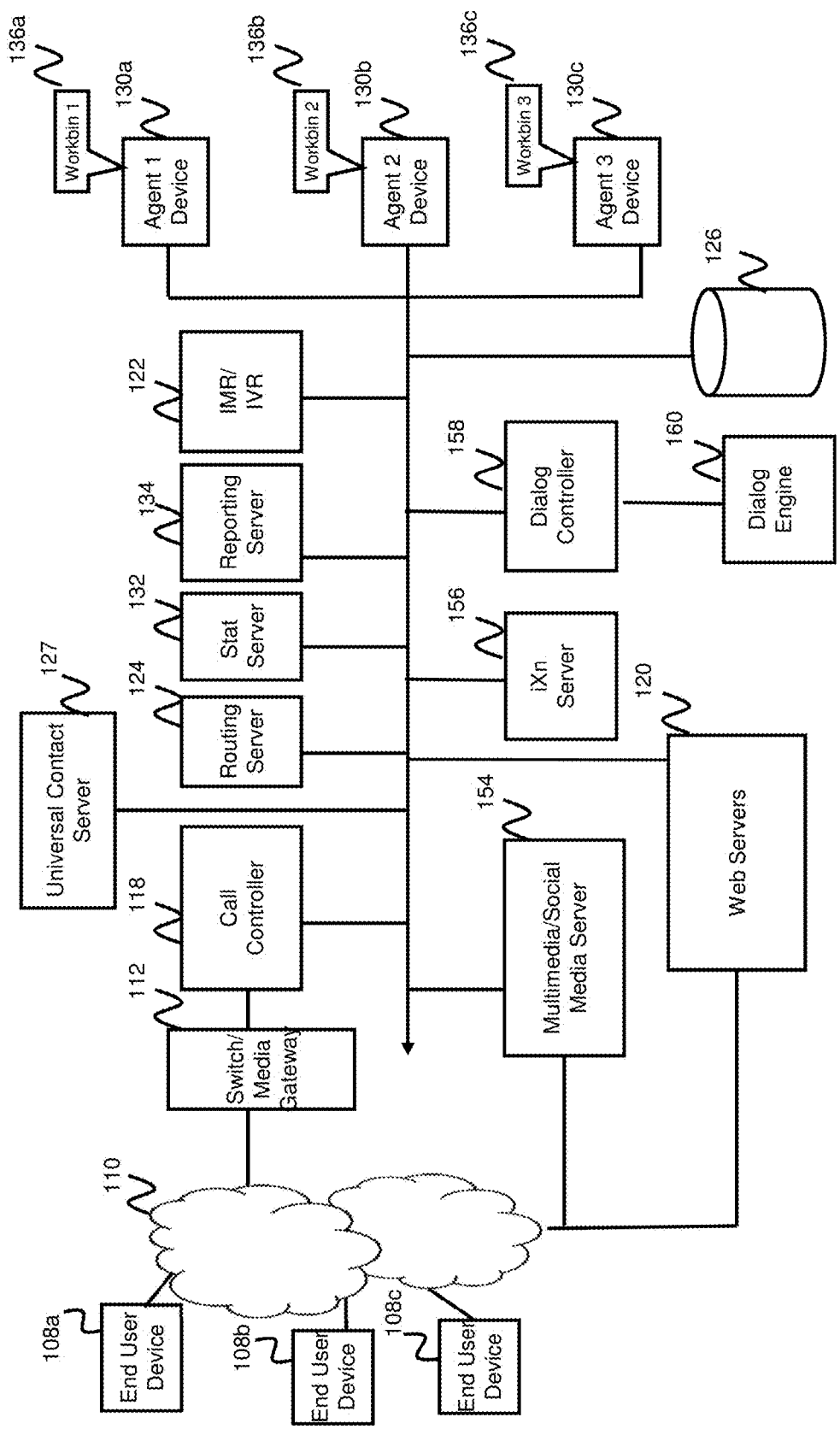
FIG. 1 is a schematic block diagram of a system for supporting a contact center in providing contact center services according to one exemplary embodiment of the invention.

In general terms, embodiments of the present invention relate to automated response systems, and more specifically to a directed dialog system blended with machine learning that is intended to exploit the strengths of a traditional directed dialog system while overcoming the limitations of such a system through machine learning. An example of a directed dialog system is a speech-enabled IVR system. Such a system may be configured to interact with a customer via voice to obtain information to route a call to an appropriate contact center agent, and/or to help the customer to navigate to a solution without the need of such contact center agent. In this regard, the IVR system may provide a directed dialog prompt that communicates a set of valid responses to the user (e.g. "How can I help you? Say something like 'Sales' or 'Billing'").

Although a voice IVR system is used as an example of an automated response system, a person of skill in the art should recognize that the embodiments of the present invention are not limited to voice, but apply to other modes of communication including text and chat. Thus, any reference to dialog herein refers to both voice and non-voice dialogs.

Whether it is voice or text-based dialog, there are certain benefits to directed dialog systems that make their use attractive. For example, a directed dialog system gives a business control over how the customer experience is delivered via relatively easy-to-understand dialog flows that are executed with relatively high precision. Effort is made in such systems to obtain answers from the customer in a step-by-step manner, and the many inputs from the customer are explicitly confirmed to ensure that such inputs are correctly understood. The level of precision and control that is possible with directed dialog thus allows for detailed and complex transactions and queries to be constructed and executed.

Despite its strengths, there are also weaknesses in a traditional directed dialog system. For example, a traditional directed dialog system's restricted scope of semantic interpretation and response formulation often inhibits its understanding of unstructured voice or text input that contains more information than what it expects at a given point in the dialog. Thus, in a typical directed dialog, the customer is taken through all the steps of the dialog, although a target intent may be evident from the initial user utterance. For example, assume that a customer opens the dialog with the statement "I want to pay my bill." This is enough information to determine that the customer intent is "Bill Payment" rather than, for example, either "Balance Inquiry" or "Sales."

A traditional dialog system, however, may not understand the utterance "I want to pay my bill," as it does not expect such utterance at the beginning of the dialog. Thus, the dialog system may proceed to ask questions to the customer to eliminate the "Balance Inquiry" and "Sales" options, to ultimately conclude that the user intent is "Bill Payment."

Another weakness of a traditional directed dialog system is that it frequently requires painstaking detail in creating prompts for menu options and parameter values, and for checking responses. Traditional systems also require explicit specification of confirmation procedures and branch points which can become onerous.

Embodiments of the present invention are aimed in addressing the weaknesses of a traditional directed dialog system while continuing to exploit its strengths. In this regard, embodiments of the present invention include a dialog engine configured to work with a traditional directed dialog system (or a more compact, domain knowledge-structure-based representation of such traditional directed dialog system) to enable the dialog system to move the customer through a directed dialog, dynamically, based on information extracted from the dialog, and based on assessment of what is known and not known, in order to identify and achieve customer goals. In this regard, the dialog engine is configured to take an unstructured, natural language input from the customer during an interaction, and extract a maximum amount of information from the utterance to identify a customer's intent, fill in information to act on an identified intent, and determine which if any dialog steps should be skipped.

According to one embodiment, the dialog engine is equipped with a more robust natural language understanding capability that is aimed to improve the ability to extract information with less restrictions on the format of the content. According to one embodiment, robustness is increased by representing the uncertainty of a response, probabilistically, which allows the system to reason accordingly by being more aggressive when confident, and conservative when uncertain. According to one embodiment, the dialog engine is also configured to automatically traverse branch points and options in a dialog based on what is known and with what level of confidence, and to automatically ask for clarification questions to disambiguate between alternate possibilities.

Although embodiments of the present invention contemplate the use of a directed dialog system, a person of skill in the art should recognize that the queries posed by the system needed not be directed queries that expressly identify the set of valid responses, but may be one that provides open ended prompts (e.g. simply saying "How can I help you?") to receive an open-ended response.

FIG. 1 is a schematic block diagram of a system for supporting a contact center in providing contact center services according to one exemplary embodiment of the invention. The contact center may be an in-house facility to a business or enterprise for serving the enterprise in performing the functions of sales and service relative to the products and services available through the enterprise. In another aspect, the contact center may be operated by a third-party service provider. According to some embodiments, the contact center may operate as a hybrid system in which some components of the contact center system are hosted at the contact center premise and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms "interaction" and "communication" are used interchangeably, and generally refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

According to one example embodiment, the contact center system manages resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end users) desiring to receive services from the contact center may initiate inbound communications (e.g., telephony calls) to the contact center via their end user devices 108a-108c (collectively referenced as 108). Each of the end user devices 108 may be a communication device conventional in the art, such as, for example, a telephone, wireless phone, smart phone, personal computer, electronic tablet, and/or the like. Users operating the end user devices 108 may initiate, manage, and respond to telephone calls, emails, chats, text messaging, web-browsing sessions, and other multi-media transactions.

Inbound and outbound communications from and to the end user devices 108 may traverse a telephone, cellular, and/or data communication network 110 depending on the type of device that is being used. For example, the communications network 110 may include a private or public switched telephone network (PSTN), local area network (LAN), private wide area network (WAN), and/or public wide area network such as, for example, the Internet. The communications network 110 may also include a wireless carrier network including a code division multiple access (CDMA) network, global system for mobile communications (GSM) network, or any wireless network/technology conventional in the art, including but to limited to 3G, 4G, LTE, and the like.

According to one example embodiment, the contact center system includes a switch/media gateway 112 coupled to the communications network 110 for receiving and transmitting telephony calls between end users and the contact center. The switch/media gateway 112 may include a telephony switch or communication switch configured to function as a central switch for agent level routing within the center. The switch may be a hardware switching system or a soft switch implemented via software. For example, the switch 112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 118 which may, for example, serve as an adapter or interface between the switch and the remainder of the routing, monitoring, and other communication-handling components of the contact center.

The call controller 118 may be configured to process PSTN calls, VoIP calls, and the like. For example, the call controller 118 may be configured with computer-telephony integration (CTI) software for interfacing with the switch/media gateway and contact center equipment. In one embodiment, the call controller 118 may include a session initiation protocol (SIP) server for processing SIP calls. According to some exemplary embodiments, the call controller 118 may, for example, extract data about the customer interaction such as the caller's telephone number, often known as the automatic number identification (ANI) number, or the customer's internet protocol (IP) address, or email address, and communicate with other CC components in processing the interaction.

According to one exemplary embodiment of the invention, the system further includes an interactive media response (IMR) server 122, which may also be referred to as a self-help system, virtual assistant, or the like. The IMR server 122 may be similar to an interactive voice response (IVR) server, except that the IMR server 122 is not restricted to voice, but may cover a variety of media channels including voice. Taking voice as an example, however, the IMR server 122 may be configured with an IMR script for querying customers on their needs. For example, a contact center for a bank may tell customers, via the IMR script, to "press 1" if they wish to get an account balance. If this is the case, through continued interaction with the IMR server 122, customers may complete service without needing to speak with an agent. The IMR server 122 may also ask an open ended question such as, for example, "How can I help you?" and the customer may speak or otherwise enter a reason for contacting the contact center. The customer's response may then be used by a routing server 124 to route the call or communication to an appropriate contact center resource.

If the communication is to be routed to an agent, the call controller 118 interacts with the routing server (also referred to as an orchestration server) 124 to find an appropriate agent for processing the interaction. The selection of an appropriate agent for routing an inbound interaction may be based, for example, on a routing strategy employed by the routing server 124, and further based on information about agent availability, skills, and other routing parameters provided, for example, by a statistics server 132.

In some embodiments, the routing server 124 may query a customer database, which stores information about existing clients, such as contact information, service level agreement (SLA) requirements, nature of previous customer contacts and actions taken by contact center to resolve any customer issues, and the like. The database may be, for example, Cassandra or any NoSQL database, and may be stored in a mass storage device 126. The database may also be a SQL database and may be managed by any database management system such as, for example, Oracle, IBM DB2, Microsoft SQL server, Microsoft Access, PostgreSQL, MySQL, FoxPro, and SQLite. The routing server 124 may query the customer information from the customer database via an ANI or any other information collected by the IMR server 122.

Once an appropriate agent is identified as being available to handle a communication, a connection may be made between the customer and an agent device 130a-130c (collectively referenced as 130) of the identified agent. Collected information about the customer and/or the customer's historical information may also be provided to the agent device for aiding the agent in better servicing the communication. In this regard, each agent device 130 may include a telephone adapted for regular telephone calls, VoIP calls, and the like. The agent device 130 may also include a computer for communicating with one or more servers of the contact center and performing data processing associated with contact center operations, and for interfacing with customers via voice and other multimedia communication mechanisms.

The contact center system may also include a multimedia/social media server 154 for engaging in media interactions other than voice interactions with the end user devices 108 and/or web servers 120. The media interactions may be related, for example, to email, vmail (voice mail through email), chat, video, text-messaging, web, social media, co-browsing, and the like. In this regard, the multimedia/social media server 154 may take the form of any IP router conventional in the art with specialized hardware and software for receiving, processing, and forwarding multi-media events.

The web servers 120 may include, for example, social interaction site hosts for a variety of known social interaction sites to which an end user may subscribe, such as, for example, Facebook, Twitter, and the like. In this regard, although in the embodiment of FIG. 1 the web servers 120 are depicted as being part of the contact center system, the web servers may also be provided by third parties and/or maintained outside of the contact center premise. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 156 interacts with the routing server 124 for selecting an appropriate agent to handle the activity. Once assigned to an agent, an activity may be pushed to the agent, or may appear in the agent's workbin 136a-136c (collectively referenced as 136) as a task to be completed by the agent. The agent's workbin may be implemented via any data structure conventional in the art, such as, for example, a linked list, array, and/or the like. The workbin 136 may be maintained, for example, in buffer memory of each agent device 130.

According to one exemplary embodiment of the invention, the mass storage device(s) 126 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 126 or elsewhere. The mass storage device may take form of a hard disk or disk array as is conventional in the art.

According to some embodiments, the contact center system may include a universal contact server (UCS) 127, configured to retrieve information stored in the CRM database and direct information to be stored in the CRM database. The UCS 127 may also be configured to facilitate maintaining a history of customers' preferences and interaction history, and to capture and store data regarding comments from agents, customer communication history, and the like.

The contact center system may also include a reporting server 134 configured to generate reports from data aggregated by the statistics server 132. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to one embodiment, the system of FIG. 1 further includes a dialog controller 158 and associated dialog engine 160. Although the dialog controller 158 and dialog engine 160 are depicted as functionally separate components, the dialog controller 158 and dialog engine 160 may be implemented in a single module. Also, the functionalities of the dialog controller 158 may be provided by one or more servers of the system of FIG. 1, such as, for example, the IMR 122, multimedia/social media server 154, and/or the like.

According to one embodiment, the dialog controller 158 is configured to engage in a dialog with a customer of the contact center. In this regard, in response to an interaction being detected by the call controller 118 or multimedia/social media server 154, the routing server 124 determines that the call should be routed to the dialog controller 158 for engaging in an automated dialog with the customer. The dialog may be conducted via voice, text, chat, email, and/or the like. According to one embodiment, the dialog controller retrieves a specification of the dialog flow (also referred to as a script) that contains various dialog blocks that are arranged hierarchically in a tree or graph. According to one embodiment, a position in the hierarchy is reached based on calculating a probability of user intent based on knowledge accumulated so far. A prompt is output based on such probability (e.g. intent/more information needed prompt). Upon receiving a response from the user, a next block down the hierarchy is retrieved and executed. The process continues until a goal block matching the user intent is identified.

According to one embodiment, the dialog conducted by the dialog controller 158 is enhanced based on input provided by the dialog engine 160. In this regard, the dialog engine analyzes the customer's responses during each turn of the dialog and provides to the dialog controller identification of a next block of the dialog that is recommended based on each response. The recommendation may be based on probabilities and/or confidence measures relating to user intent. In making the recommendation, the dialog engine may determine that certain blocks of the dialog flow can be skipped based on determining, with a certain level of confidence, that it already has information that would be requested by these blocks.

In general terms, the dialog engine 160 uses a domain model to control its behavior in order to achieve goals. For a directed dialog system, the goal is generally to identify customer intent, fill in information that may be deemed necessary to act on that intent, and take the action to resolve the matter. One example of an intent of a customer in reaching out the contact center may be to pay his bill ("Pay Bill") which may require information such as payment method ("payment_method") and amount ("payment_amount") in order for the goal to be executed. This goal may be represented as: PayBill(payment_method, payment_amount), and may be referred to as a frame, or a named n-tuple of parameters. A directed dialog may imply a discrete set of such frames, each one representing the kind of intents it can support and the information it needs to support them.

For example, the frames for a flow that is part of a Help Desk application to support customers for sales, billing inquiries, and bill payment, may be represented as:

Sales( )
InquireBill(account_id)
PayBill(account_id, payment_amount, payment_method)

According to one embodiment, a fully defined frame is a precondition for taking action. Typically, a big portion of a dialog conducted via a dialog flow is for determining which frames apply and what values hold for each parameter. These aspects of a directed dialog may be referred to as intent classification (choosing which of a finite list of frames to work on) and entity extraction (filling out required parameters for the chosen frame), both of which may be referred to as slot-filling.

According to one embodiment, a set of possible frames may be deemed to be a slot, with a value for each frame. For example, in the above Help Desk application, there may be a slot called HelpDesk, with values [Sales, PayBill, InquireBill]. Any of the parameters to be filled may also be deemed to be slots, where the possible slot values are given by the nature of the data type. For example, a slot may be identified for account_number, for PayBill and InquireBill. Additional slots may be identified for payment_amount, and payment_method if PayBill is the target intent. A set of possibly active slots may be identified based on the directed dialog in the above example as:

HelpDesk: [Sales, PayBill, InquireBill]
account_number: [account1, account2, . . . , account]
payment_method: [Check, CreditCard, PayPal]

According to one embodiment, the dialog engine maintains a set of active slots to be managed as the dialog evolves. If a slot has more than one possible value available, a commitment is made to a single value based on, for example, disambiguating the slot values. In the above example, HelpDesk is a slot with possible values Sales, PayBill, and InquireBill. If the dialog engine is not confident as to which one of the various values is the one intended by the customer, it may try to disambiguate by doing one or more of the following:

1. Confirm slot values it believes to be true e.g. "Do you want to pay by credit card?"
2. Ask customers to choose between a set of slot values e.g. "Do you want to pay your bill, inquire about your bill, or speak to a sales person?"
3. Ask open questions e.g. "How can I help you?", "How would you like to pay?"
4. Implicit confirmation e.g. "I think you want to pay your bill. How do you want to make the payment?"

According to one embodiment, the dialog engine considers a slot as a probability distribution over its possible values. For example, the HelpDesk slot might begin with all values equally likely:

HelpDesk: [(Sales, 0.33), (PayBill, 0.33), (InqureBill, 0.33)

Assume that the customer then states: "Hi, can you help me with my bill payment?"

According to one embodiment, the dialog engine may update the belief (also referred to as confidence) about what values apply for HelpDesk as follows:

HelpDesk: [(Sales, 0.05), (PayBill, 0.65), (InqureBill, 0.3)]

At this point, a dialog engine might decide that it is most likely a PayBill issue and respond with, for example: "It looks like you want to pay your bill. Is that correct?"

According to one embodiment, if the customer answers the above question in the affirmative, PayBill is set to 1. If the customer answers in the negative, Paybill is set to 0, and the other values are adjusted accordingly using normalization so they sum to 1. According to one embodiment, rule based methods also apply, where high precision is required, or the dialog control simply has enough information to assign slot values (e.g. an action to look up the preferred payment method for this customer may set the value for Paybill to be 1).

The probabilistic representation of state has many advantages, such as, for example, the ability to incorporate statistical techniques (machine learning) to update state for a robust natural language understanding system, while allowing the usual directed dialog mechanisms (e.g. prompting confirmations, asking questions, looking up data in external systems) to still be applied. Probabilistic representation of state also provides a representation of the problem that directly drives the flow of dialog, based on the necessity to reduce uncertainty (i.e. minimize entropy), and has a mapping to determine if intermediate nodes in a dialog can be skipped (assumed true), confirmed, or must be elaborated by offering choices or open ended prompts.

Employing the probabilistic representation of state, the dialog engine 160 provides the dialog controller 158 with the following run time capabilities at each turn of the dialog:

1. Updates to the context of the dialog in terms of keys and values of the dialog state.
2. Update to the next best node to go to (referred to as "target node").
3. The response to generate back to the user for the next focus node. A focus node is a current position of the dialog in the dialog flow. According to one embodiment, this response is selected from the range of responses typically provided in a directed dialog model. In addition, the dialog engine is configured to generate responses as part of its slot-filling behavior without requiring explicit input, although allowing for such input to be leveraged. This helps reduce the effort level in specifying/generating the dialog flow.

According to one embodiment, the dialog controller 158 takes the information from the dialog engine 160 and advances the dialog in the following manner:

1. Any node in the dialog flow on the path to the target node that is designed to fill parameters may be skipped if the parameter value is known.
2. Any node in the dialog path that branches based on a parameter value that is known may be automatically branched. For example: if account_type=Business, branch left, else branch right. If the account type is known, then no need to ask for it first. Simply take the path indicated.
3. According to one embodiment, any node on the path to a target node that must execute for any reason, is executed before advancing further. For example, a node might require execution to authenticate the customer.
4. According to one embodiment, any node on the path that fills a parameter value for which the value is not already known is executed.

Embodiments of the present invention allow the evolution of a more concise declarative representation of a directed dialog flow instead of detailed specifications of directed dialog that define how a dialog is to be executed. The declarative representations may focus what information must be obtained, and allows the control structures for obtaining the required information to be driven from this model. Thus, instead of painstakingly expressing each question that needs to be asked as each turn of the dialog, questions may dynamically be generated based on what is known on candidate intent or candidate slot values. In other words, given a definition of what needs to be known, a question or prompt may automatically be generated without defining the exact prompt as part of the dialog flow. The question may be generated, for example, using a question generation template. For example, suppose there is a frame with:

1. intent: Order Pizza
2. parameters:
 a. crust: [thin, thick, deep dish]
 b. toppings: [ham, pineapple, cheese, pepperoni]
 c. size: [small, medium, large, super]

Assume that the toppings of the pizza need to be resolved next. Given this, the dialog engine may be configured to dynamically generate a question based on the slot that needs to be filled: e.g. "For your topping, would you like ham, pineapple, cheese, or pepperoni?" This exact prompt need not be expressly specified during the generating of the dialog flow.

According to one embodiment, the generated dialog may also be employed for use in other contexts without requiring express definitions of the prompts to be employed at each turn of the dialog. For example, assume that the same restaurant that takes pizza orders also takes reservations. The frame for such intent may be:

1. intent: Make a Reservation
2. parameters:
 a. date: Date
 b. time: Time
 c. name: text
 d. party_size: [2, . . . , 10]

With the above elements in the model, a dialog may be generated that should be able to handle all the necessary back and forth to update beliefs about slot values and ultimately fill in those values.

Figure 2:
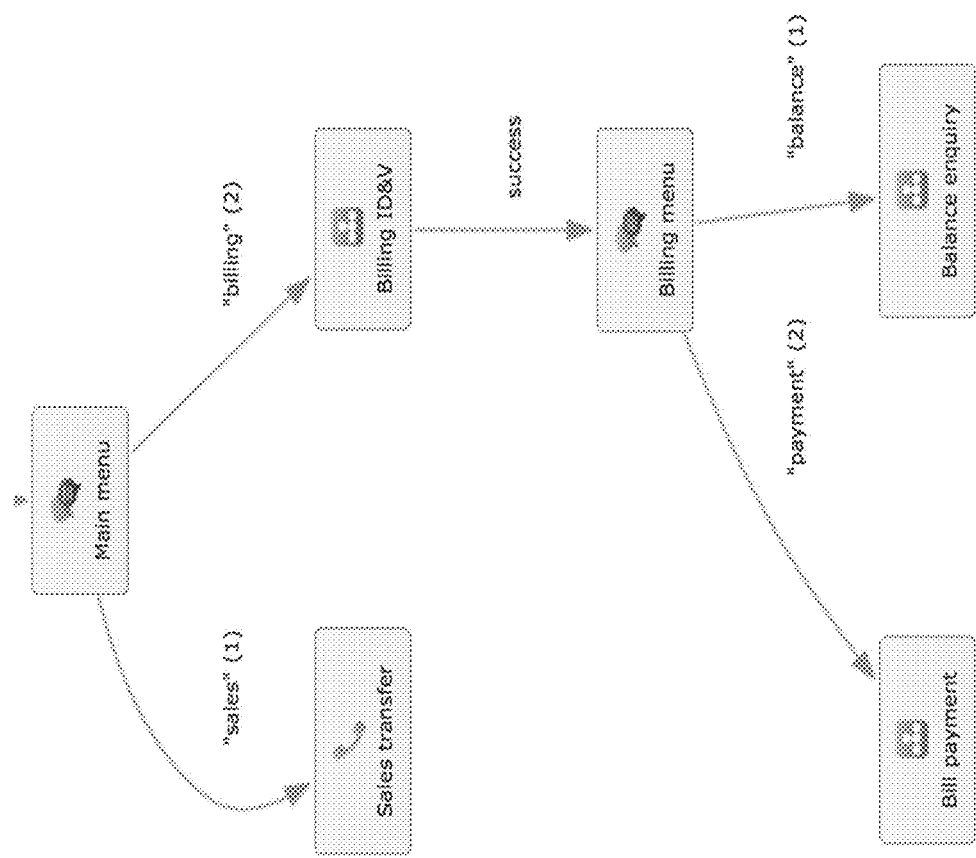
FIG. 2 is a conceptual layout diagram of an exemplary dialog flow invoked by a dialog controller according to one embodiment of the invention.

FIG. 2 is a conceptual layout diagram of an exemplary dialog flow invoked by the dialog controller 158 according to one embodiment of the invention. Each node of the graph may be referred to as a dialog block. According to one embodiment, each dialog block is associated with metadata indicating a block name, associated prompt, children blocks, and associated goal frames. End of a dialog indicates identification of a goal or a dialog failure.

Figure 3:
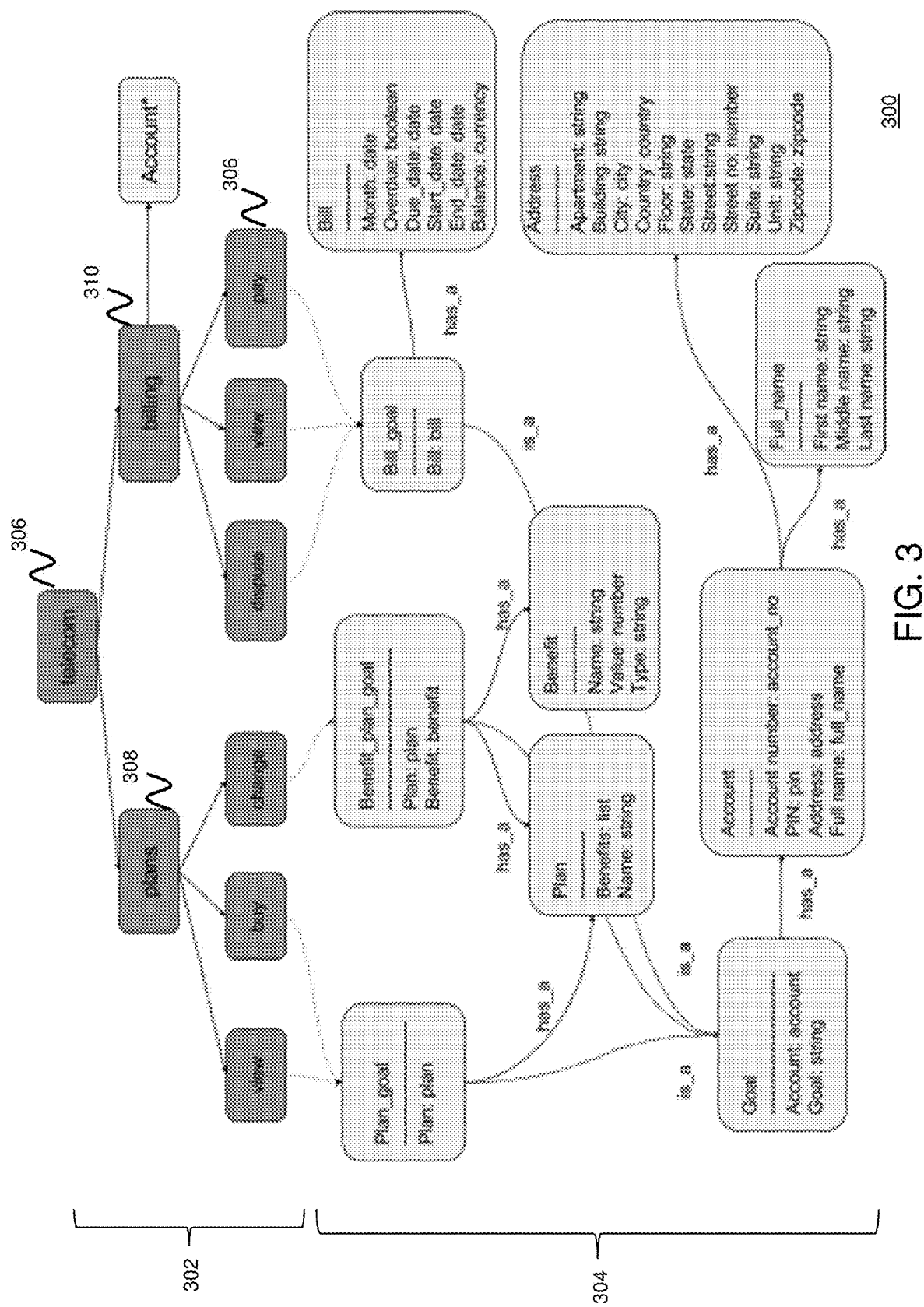
FIG. 3 is a conceptual layout diagram of a domain model used by a dialog engine in controlling a flow of a dialog according to one embodiment of the invention.

FIG. 3 is a conceptual layout diagram of a domain model 300 used by the dialog engine 160 in controlling the flow of the dialog according to one embodiment of the invention. The domain model may be derived from the specification of the dialog flow as is described in further detail below. In general terms, the domain model includes a goal-classification (decision) tree 302 and associated frames 304. The various nodes of the tree 302 are traversed as the dialog progresses according to a dialog flow, until one of the goal leaves 306 is reached. In this regard, the nodes of the goal-classification tree 302 are traversed concurrently with the traversal of the corresponding dialog flow, such as the dialog flow of FIG. 2.

In one embodiment of the invention, a separate dialog flow, such as the dialog flow of FIG. 2, need not be separately invoked and traversed concurrently. Instead, the prompts corresponding to the nodes of the tree may be incorporated or attached to the nodes themselves. In this embodiment, the decision tree directs the dialog with the customer and provides appropriate prompts based on a current position in the decision tree. Thus, the decision tree and associated nodes may be deem to incorporate the functions of the dialog flow and associated blocks.

According to one embodiment, the frames 304 of the domain model are goal frames mapped to intent nodes of the tree 302. Each frame is associated with one or more values that the frame may take depending on the dialog with the user. According to one embodiment, the dialog engine 160 maintains a list of active frames to be managed as the dialog evolves. A frame may have 0 or more slots that need values. If a value is to be assigned, and there is different possible values during the dialog, the dialog engine takes steps to commit the frame to a single value. For example, the dialog engine may take one or more actions to disambiguate between the possible values.

Figure 4A:
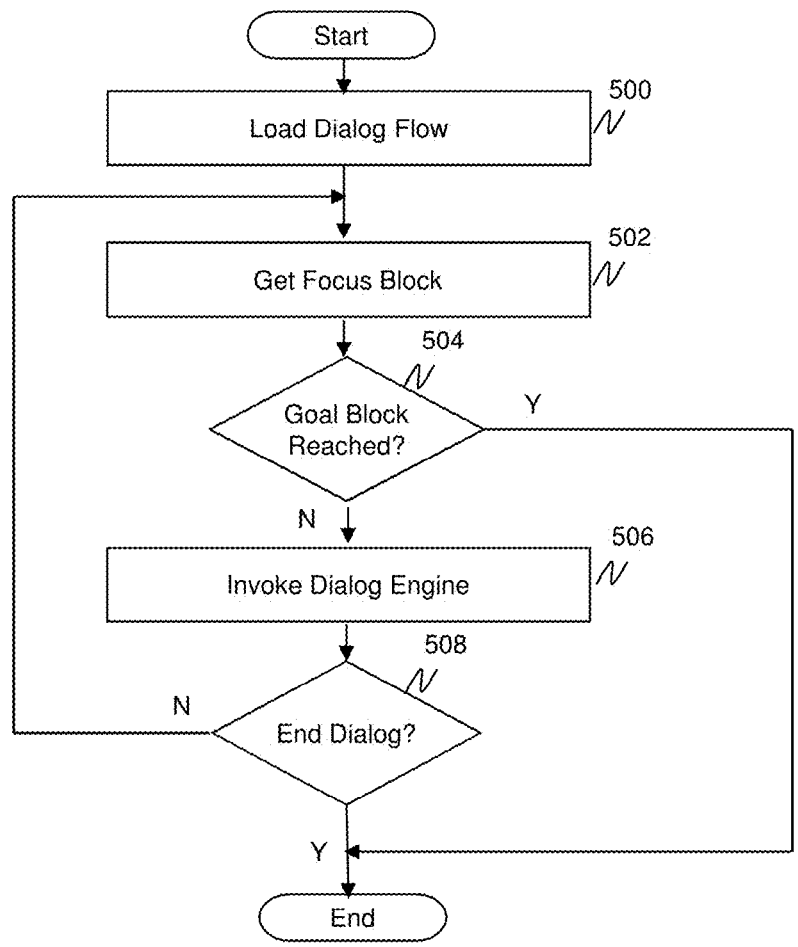
FIG. 4A is a flow diagram of an overall process executed by a dialog controller in implementing dynamic control of dialogs with customers during an automated self-service process according to one embodiment of the invention.

FIG. 4A is a flow diagram of an overall process executed by the dialog controller 158 in implementing dynamic control of dialogs with customers during an automated self-service process according to one embodiment of the invention. The process starts, and in act 500, the dialog controller 158 loads a dialog flow corresponding to a particular route point. The route point may be identified by a telephone number, email address, and/or the like.

In act 502, the controller 158 identifies/gets a focus block in the dialog flow. The dialog controller 158 further outputs a prompt or response associated with the current focus block. An initial response upon loading of the dialog flow may be a welcome message. During a middle of the dialog, the focus block may emit a prompt for clarifying the customer's goal/intent. According to one embodiment, all prompts specified in the directed dialog are passed through the dialog controller 158.

In act 504, the dialog controller 158 determines whether the current block is a goal. If the answer is YES, the dialog terminates as the goal/intent of the user has been identified, and a corresponding goal frame with the slot values filled-in may be returned. For example, the goal frame may be PayBill with the payment method and payment amounts filled-in. This information may then be used by one or more servers of the contact center to take action based on the identified frame and values. For example, a bill payment service may be automatically invoked via appropriate signaling messages to allow the customer to pay the indicated amount using the indicated payment method. In another example, the action may be to route the call to a contact center agent who is skilled to handle the identified goal.

If the current block is not a goal, the dialog controller 158 invokes the dialog engine in act 506 for retrieving an associated goal classification tree for efficiently progressing the dialog forward until the goal is reached. In this regard, the dialog engine receives and processes the user response, and provides its own response which may include, for example, identification of a target block in the dialog flow to which the dialogue is to progress, and associated confidence/belief value. In this regard, the target block provides an appropriate system action based on the computed intent of the customer. In some embodiments, the response by the dialog engine may also include keys and values for a current dialog state, identification of the target node in the goal clarification tree that corresponds to the target block in the dialog flow, and a prompt to be output to the user for the identified target node.

In act 508, the dialog controller 158 determines if the response from the dialog engine indicates that the conversation should terminate despite the fact that the goal has not been reached. The conversation may be terminated, for example, if there is a failure in the dialog. A failure may be detected, for example, if despite the various attempts, the dialog engine is unable to recognize a customer's response.

If the conversation is not to terminate, the dialog progresses to the target block that is output by the dialog engine, the target block becomes the current focus block in act 502, and the process repeats. According to one embodiment, in progressing to the target block, one or more intermediate blocks on the path to the target block are skipped. The intermediate blocks are blocks that are hierarchically above the target block and which would have been skipped in a traditional directed dialog system.

Figure 4B:
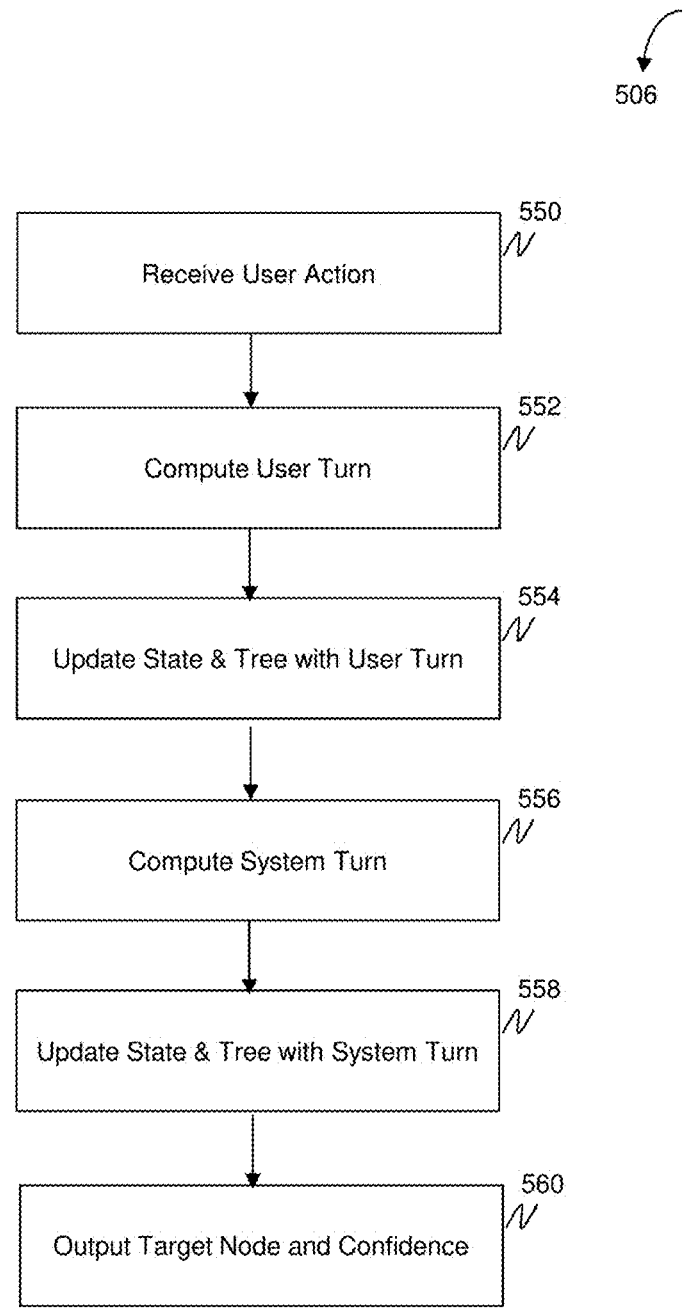
FIG. 4B is a more detailed flow diagram of advancing the dialog with the customer by invoking a dialog engine according to one embodiment of the invention.

FIG. 4B is a more detailed flow diagram of act 506 of FIG. 4A of advancing the dialog with the customer by invoking the dialog engine according to one embodiment of the invention. In act 550, the dialog engine receives an action taken by the customer during the dialog. The user action may be, for example, a spoken or textual utterance, selection of a key, button, or icon, and/or the like. Unlike a traditional dialog system that is configured to only accept and understand a limited list of responses preset by the directed dialog system, embodiments of the present invention allow users to provide natural language responses outside of the limited list of responses.

In act 552, the dialog engine processes the user action and computes a user turn in the dialog to extract tags and slot values along with associated confidence measures where possible. The tags may help determine the type of response that the dialog engine is to output in response to the user action. For example, if the extracted tag indicates that the user is hurling an insult, the response output by the dialog engine may be a prompt indicating that there is no need for using insults, instead of a prompt that tries to advance the dialog towards goal resolution.

According to one embodiment, any slot value pair that is collected at the particular turn of the dialog is stored as possible a candidate that may be used to fill a goal frame 304 once a goal leaf node (e.g. goal leaf 306) is reached.

In act 554, the dialog engine updates the dialog state based on the computed user turn. In this regard, the dialog engine saves the extracted tags and/or further updates the state based on the collected slot value pairs. In addition, the goal clarification tree 302 (FIG. 3) is also updated as needed based on computed beliefs and probabilities. According to one embodiment, the following values are computed/updated for each node of the goal classification tree at each turn: 1) belief/confidence; 2) current probability; 3) upper threshold; 4) lower threshold; and 5) slot value.

The belief/confidence value for a particular node is a value indicative of a probability that the intent of a customer is the intent represented by the node, that takes into account prior belief values for the node, as well as a current probability for the node. According to one embodiment, the belief value for the node takes into account the dialog with the customer so far (contextual knowledge), whereas the current probability for the node is computed based on a current classification of intent based on a current utterance, without taking into account history. In the beginning, the belief is equal to the probability as there is no prior history in which the belief may be based.

According to one embodiment, the current belief value may be computed according to the following formula:

$$\text{current\_belief} = 1 - (1 - \text{prior\_belief}) * (1 - \text{current\_probability})$$

The computing of the current probability value of a particular node may invoke a multi-class intent classifier to estimate the probability of each one of various classification classes based on a current utterance of the user. According to one embodiment, a separate class may be maintained for each node of the goal classification tree. The probability may be computed based on historical data and examples provided to the system of instances of correct classification. In this regard, the intent classifier is provided a training set of <dialog, intent> pairs to train a model for intent classification.

As discussed, the computing the belief value that is indicative of the probability of being classified in one of the classes is based not only on the current probability value, but also on the contextual knowledge of the dialog. Contextual knowledge includes knowing where the dialog is on the goal classification tree, the responses provided so far by the customer, and/or responses provided by the dialog engine. For example, the computation of probabilities based on a single command to "view" when the dialog initially starts, is different than the computation of probabilities based on this command when the user is in the "billing" node. More specifically, at the beginning of the dialog, the possibility of the "view" node under the "plan" node may be equal to the possibility of the "view" node under the "billing" node. However, the utterance of "view" after the user reaches the "billing" node causes the "billing" view node to have a higher probability than the "plan" view node.

According to one embodiment, although the probabilities and beliefs of all the nodes in the goal classification tree are computed at each user turn, the tree is updated with only the probabilities and beliefs that correspond to the current focus node and the sub-trees under the current focus node. The computing of the belief values allows the engine to determine action steps to proceed further in the goal clarification tree.

In act 556, the dialog engine computes a system turn identifying a next best response to be provided by the dialog engine for the user turn. In this regard, the dialog engine identifies one or more active behaviors that have been triggered for the customer based on the dialog state in the dialog flow, and generates an appropriate response for each active behavior based on the dialog state and the goal classification tree. Behaviors may be triggered based on user commands, tags (e.g. tags identified in act 552), and/or the dialog flow logic. For example, the dialog engine may determine that a "goal classification" behavior has been triggered, and compute an appropriate response based on this behavior. Such response may be to identify a target node having a highest belief value for advancing the dialog to that node. Depending on the level of confidence/belief for the selected target node relative to upper and lower thresholds maintained for the node, the dialog engine may be configured to ask different types of disambiguating questions in order to determine the real intent of the user.

According to one embodiment, more than one behavior may be triggered for a customer at each system turn. The dialog engine is configured to process each active behavior and generate an appropriate response for that behavior. According to one embodiment, the behaviors are resolved in an preset order of priority. In this regard, the dominant behaviors are handled first prior to less dominant behaviors.

Specific exemplary behaviors and appropriate responses triggered by such behaviors include, for example:

1. Behavior=AgentPassThru; Action=forward dialog to agent.
2. Behavior=AgentEscalatio (e.g. triggered when user response is frustration, profanity, or lack of progress); Action=Escalate to an agent.
3. Behavior=SessionCompletion (e.g. triggered based on time, or based on asking a customer if they are done); Action=End dialog.
4. Behavior=Profanity; Action=Engage in conversation to calm the customer.

According to one embodiment, the computing of the system turn in act 556 returns a prompt and associated metadata for the response that is to be output by the dialog engine. The metadata may include, for example, information of any actions taken by the user.

In act 558, the goal-classification tree is updated if the metadata includes information of actions that help update node belief values and thresholds. For example, if the user action was an affirmation of a node belief, the belief for the node is set to 1. For example, the belief for the node "pay" under "bill" may be set to 1 if the customer answers "YES" to the prompt "Did you want to pay your bill?" The belief is further propagated bottom-up in the goal classification tree. Upper and lower thresholds associated with the node which are used to trigger different types of disambiguating questions, may also be updated based on the user action.

In act 560, the dialog engine outputs the response generated by the dialog engine based on the triggered behavior. For example, the response my simply be a prompt to be output by the dialog controller, taking of a specific action such as transferring the call to an agent, and/or identification of a target node along with a confidence value.

Figure 4C:
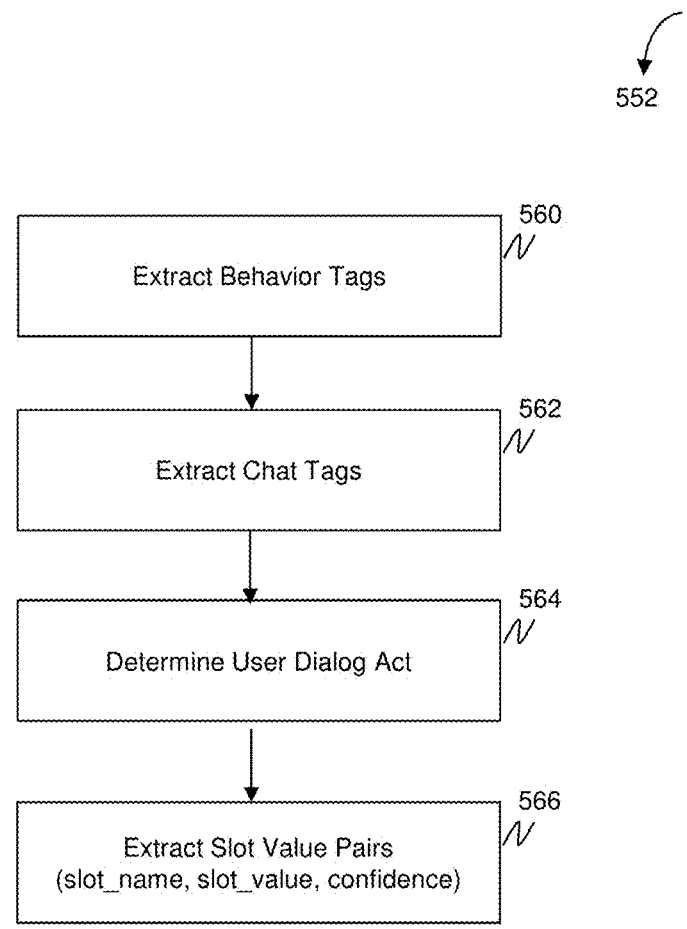
FIG. 4C is a more detailed flow diagram of a process for computing a user turn according to one embodiment of the invention.

FIG. 4C is a more detailed flow diagram of a process for computing a user turn 552 according to one embodiment of the invention. According to one embodiment, upon the dialog engine 160 receiving a user action at each turn of the dialog, the dialog engine invokes appropriate processing mechanisms to classify the user action and extract tags and collect any slot value pairs. If, for example, the user action is a verbal or textual utterance, the dialog engine engages in natural language processing to extract the tags and slot value pairs.

According to one embodiment, the computing of a user turn includes extracting any behavior tags in act 560, extracting any chat tags in act 562, and/or determining a user dialog act in act 564. An exemplary behavior tag may be a "RedirectToAgent" tag that indicates that the customer has taken action to be redirected to a contact center agent.

A chat tag may be one that identifies a specific type of utterance by the customer, such as "hello," "goodbye," "insult," "thanks," "affirm," and/or "negate," that calls for an appropriate response.

A dialog act tag may identify an action that relates to the slots of the goal classification tree. For example, an "inform" tag identifies the user action as providing a particular slot value, a "request" tag identifies the user action as requesting a particular slot value, a "confirm" tag identifies the user action as confirming a particular slot value, and a "negate" tag identifies the user action as negating a particular slot value.

According to one embodiment, slot value pairs are also extracted from the user action as appropriate in act 566. For example, in the event that the user action is one of the various user dialog acts, the dialog engine classifies the action into one or more classification types that correspond to one or more of the possible slots in the domain. For example, if the user response is one that indicates that he wants to pay his bill using a credit card, the response may be classified as a "payment_method" type, and the classification may be assigned a particular confidence value indicative of a confidence that user indeed provided a payment method type.

The dialog engine then stores the slot value pair (payment_method, credit card), and assigns the computed confidence to this slot value pair. According to one embodiment, the collected slot value pairs are maintained as possible candidates that may be used to fill a goal frame once a goal leaf node is reached.

Figure 4D:
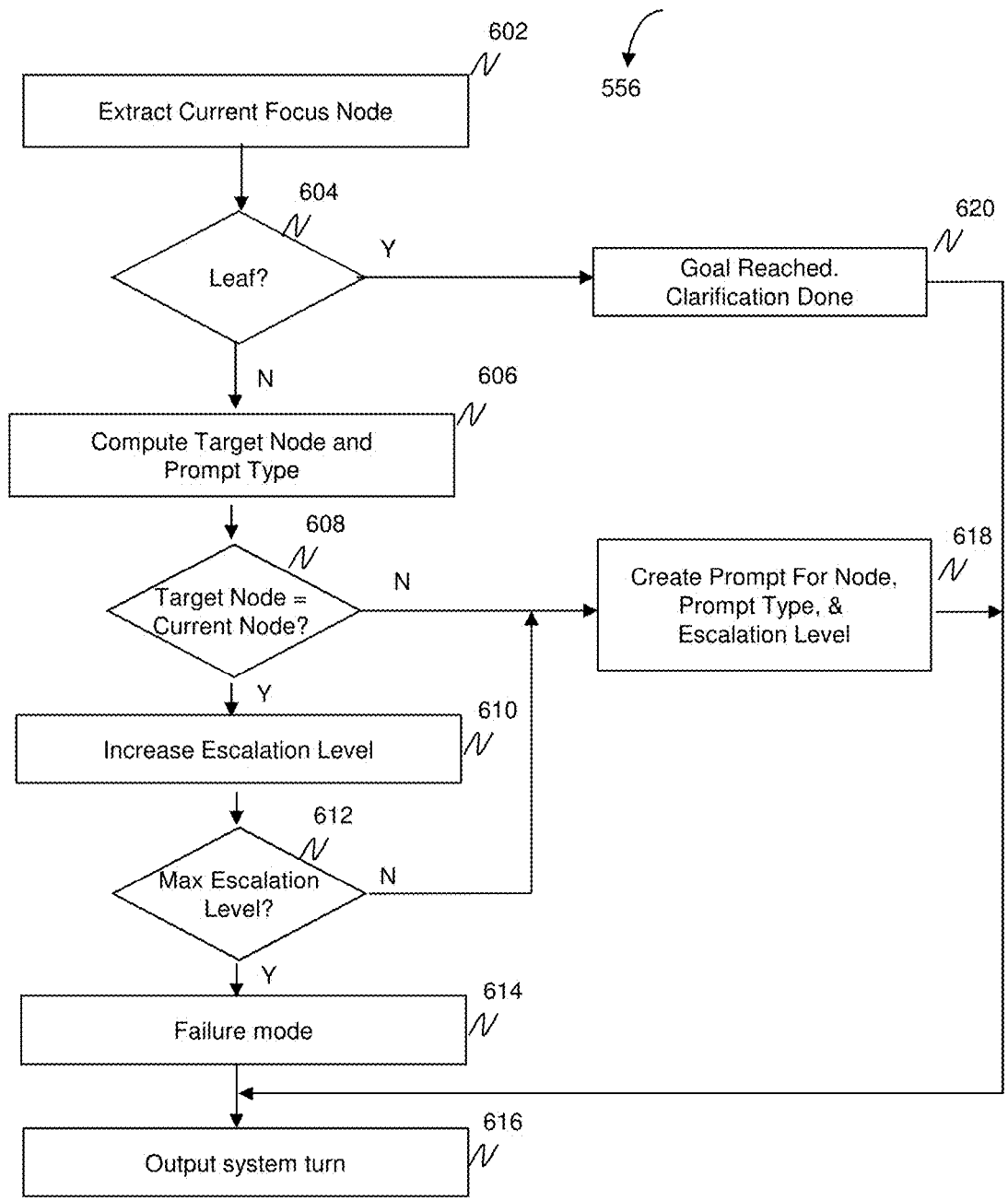
FIG. 4D is a more detailed flow diagram of computing a system turn in response to identifying that the triggered behavior is goal clarification according to one embodiment of the invention.

FIG. 4D is a more detailed flow diagram of act 556 of computing a system turn in response to identifying that the triggered behavior is goal clarification according to one embodiment of the invention. In act 602, the dialog engine extracts a current focus node of the goal clarification tree. In act 604, a determination is made as to whether the node is a leaf. If the answer is YES, the engine determines in act 620 that the goal has been reached and the clarification is complete, and the engine outputs the system turn indicative of this fact in act 616.

If the answer is NO, the dialog engine computes, in act 606, the target node in the goal classification tree, and the appropriate prompt type. In this regard, the dialog engine identifies a node with the highest belief value in the sub-tree below the current focus node. For example, if the focus node is the root node 306 (FIG. 2), and after computing the user turn given a user's utterance "I have a question about my bills," the belief of the "billing" node 310 is 60% while the belief of the "plans" node is 40%, the dialog engine may select the "billing" node as the target node. In addition, the dialog engine may identify a type of prompt to be output by the dialog controller 158 to determine the real intent/goal of the user in the next step of the dialog.

According to one embodiment, the type of prompts that may be identified by the dialog engine include, but are not limited to, implicit confirmation, explicit confirmation, and choice offer. An implicit confirmation may ask, for example, "I think you want to pay your bill. How do you want to make the payment." An explicit confirmation asks a yes or no question such as, for example, "Do you want to pay your bill?" A choice offer may ask, for example, "Do want to pay your bill, inquire about your bill, or speak to a sales person?"

According to one embodiment, in determining the applicable prompt type for the identified target node, the dialog engine computes a scaled belief value based on the beliefs of its children nodes, and compares the scaled value against the upper and lower thresholds set for the node. The scaled belief value computation for an exemplary node having children nodes A, B, and C with respectively A.belief, B.belief, and C.belief, may be as follows:

children_beliefs=[$A$.belief,$B$.belief,$C$.belief]

avg=1.0/len(children_beliefs)

Scaled_value=max(0,(max(children_beliefs)−avg)/(1−avg))

Figure 6:
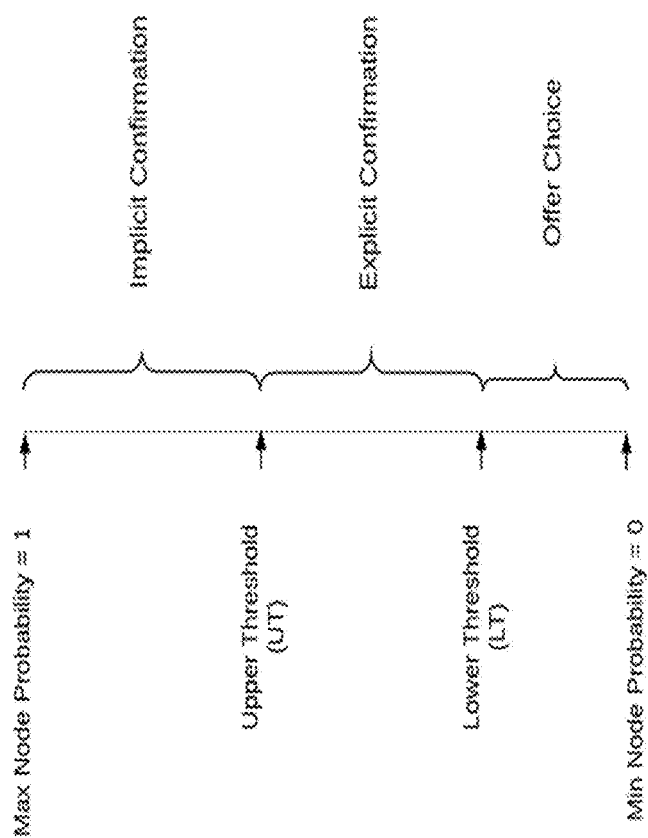
FIG. 6 is a schematic layout diagram of various types of confirmation that may be provided based on computed probabilities of intent according to one embodiment of the invention.

According to one embodiment, the scaled belief value is compared against the upper threshold (UT) and a lower threshold (LT) to determine the appropriate prompt type. For example, as is depicted, in FIG. 6, if the scaled belief value is below the lower threshold, the identified prompt type is that of offering a choice. If the scaled belief value is between the upper and lower thresholds, the identified prompt type is an explicit confirmation. If the scaled belief value is above the upper threshold, the identified prompt type is implicit confirmation.

In act 608, a determination is made as to whether the target node is a current node. This may happen, for example, if the user action is insufficient or contains errors, and cannot be used to advance the dialog any further. For example, if at a particular node the user needs to provide an account number, but the account number provided by the user is invalid, the dialog cannot progress.

If the target node is not the current node, the dialog engine increases the escalation level in act 610, and inquires in act 612 if the maximum escalation level has been reached. In this regard, a node may have a present number of escalation levels and associated prompts that may be generated if the dialog cannot progress of a next target node. For example, the prompt at a first escalation level may state: "Do you want to pay your bill?" The prompt at a second escalation level may state "I did not understand your answer, do you want to pay your bill?" The prompt at the third escalation level may state "I still do not understand your answer. Did you call in order to make a bill payment?"

If the maximum escalation level has not been reached in act 612, a prompt of the node, prompt type, and escalation level is generated in act 618, and the prompt and associated metadata is output in act 616.

If, however, the maximum escalation level has been reached, a failure mode is triggered in act 614.

Figure 5:
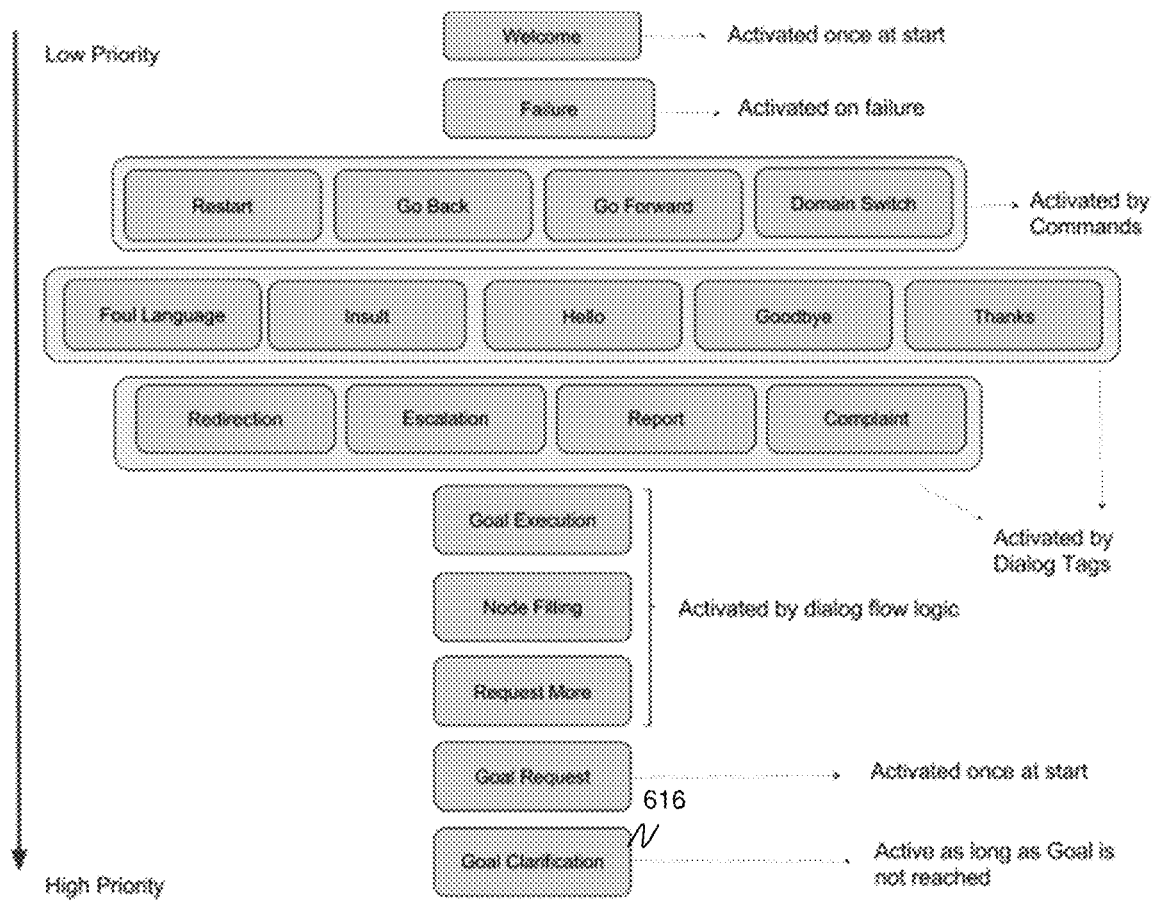
FIG. 5 is a schematic layout diagram of exemplary behaviors/actions that may be triggered at a particular user turn of the dialog according to one embodiment of the invention.

FIG. 5 is a schematic layout diagram of exemplary behaviors/actions (e.g. 616) that may be triggered at a particular user turn of the dialog according to one embodiment of the invention. According to one embodiment, the set of modular behaviors are placed in a hierarchy where any behavior that triggers lower in the hierarchy subsumes control from a behavior higher up. According to one embodiment, the priority of the behaviors is evaluated in a recurring control loop, where execution of a behavior means control passes to that behavior for this turn.

Figure 7:
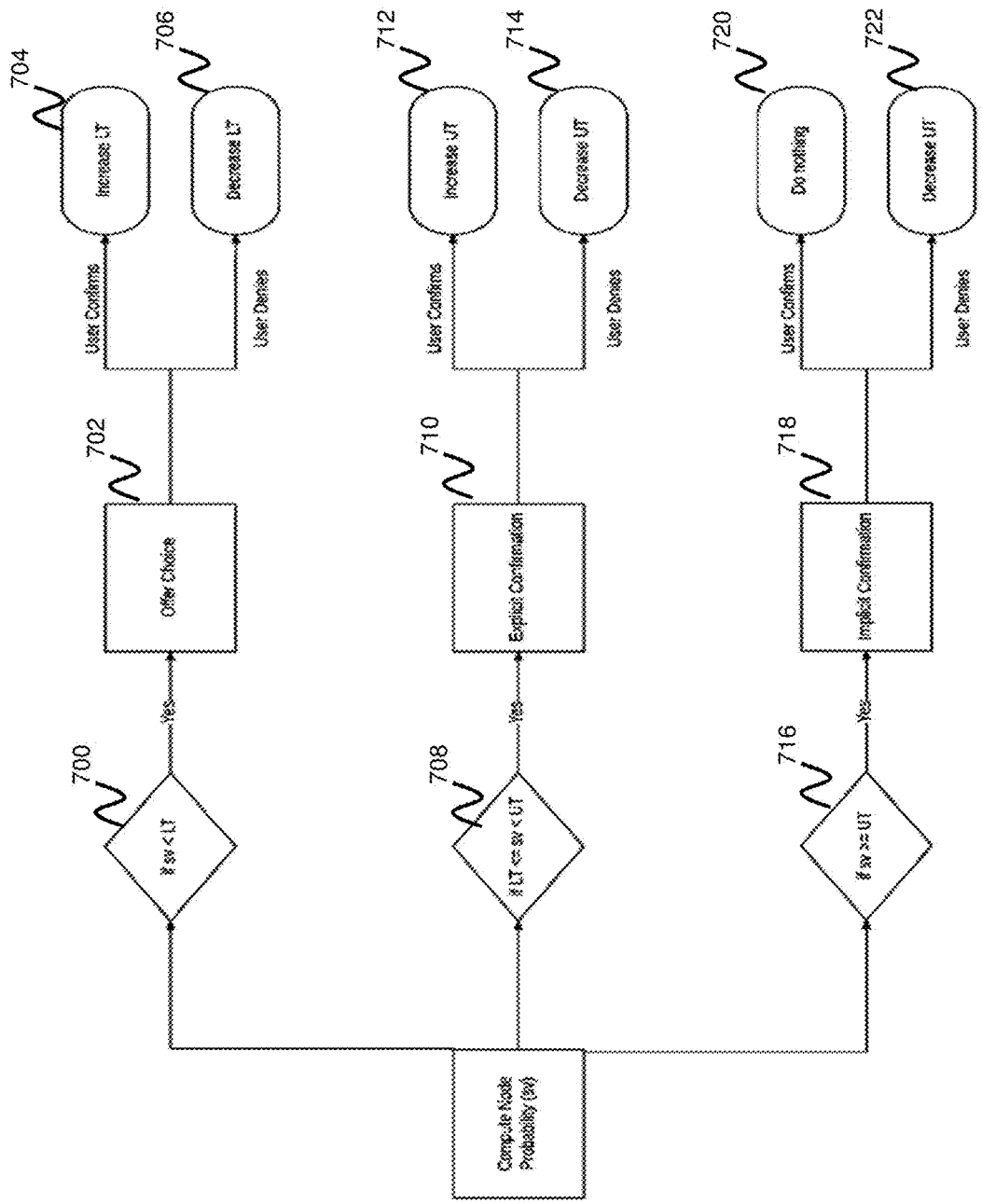
FIG. 7 is a flow diagram for dynamically updating the upper and lower thresholds (UT, LT) of a node for determining the appropriate prompt to be output according to one embodiment of the invention.

FIG. 7 is a flow diagram for dynamically updating the upper and lower thresholds (UT, LT) of a node for determining the appropriate prompt to be output according to one embodiment of the invention. According to one embodiment, the evaluation as to whether the values of LT and UT should be dynamically updated occur at each turn of the dialog based on feedback received from the customer as described above with respect to act 558.

In this regard, if a computed node probability is determined to be less than the lower threshold in act 700, the prompt that is generated offers different choices for the customer to choose from in act 702. If the user confirms these choices, the lower threshold is increased in act 704. Otherwise, if the user denies the choices, the lower threshold is decreased in act 706.

If, in act 708, the computed node probability is determined to be between the upper and lower thresholds, the prompt that is generated is an explicit confirmation in act 710. If the user confirms the value, then the upper threshold is increased in act 712. Otherwise, if the user denies the value, then the upper threshold is decreased in act 714.

If, in act 716, the computed node probability is determined to be above the upper threshold, the prompt that is generated is an implicit confirmation in act 718. If the user confirms the value, the thresholds are not modified. If the user denies the value, the upper threshold is decreased in act 722.

According to one embodiment, the magnitude of the increase or decrease in the threshold values is calculated as the absolute difference between the scaled value of beliefs over nodes and the concerned threshold. The threshold is then increased or decreased by this value.

Figure 8:
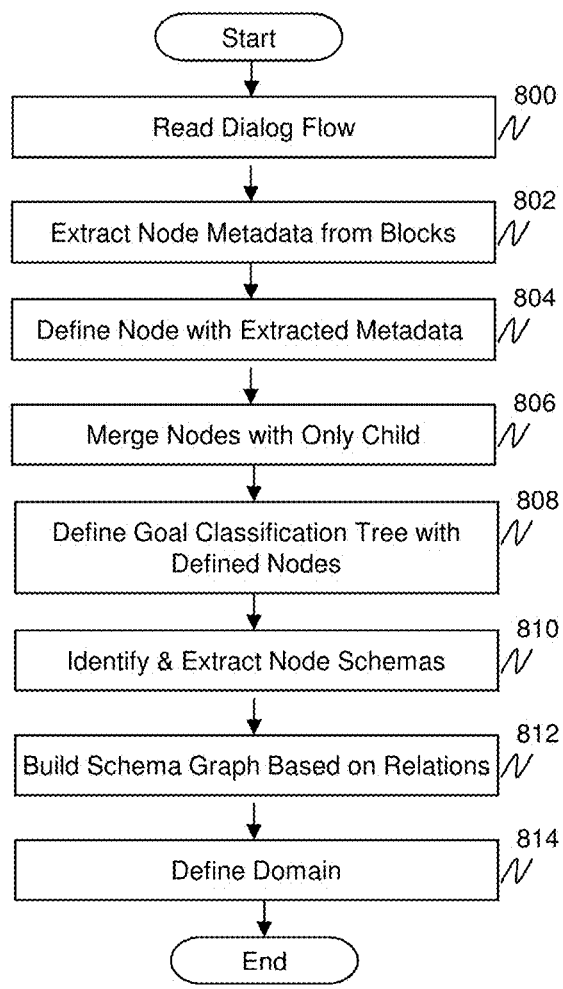
FIG. 8 is a flow diagram of a process for generating a domain model according to one embodiment of the invention.

FIG. 8 is a flow diagram of a process for generating a domain model, such as, for example, the domain model of FIG. 3, according to one embodiment of the invention. In general terms, the domain model is generated automatically by transforming an existing dialog flow of a traditional directed dialog system, into a singly rooted goal classification tree. The goal classification tree may then be invoked when the dialog flow is invoked to more expeditiously identify and achieve customer goals.

The process starts, and in act 800, a dialog flow that may be invoked by a traditional dialog system is read from, for example, the mass storage device 126.

In act 802, the dialog engine 160 extracts node metadata from each block of the dialog flow. Exemplary metadata may include, for example, the name of the block, block ID, prompts to be output upon execution of the block, identification of any associated frames, and the like.

In act 804, the dialog engine defines the nodes of a goal classification tree (e.g. the goal classification tree 302 of FIG. 3) to be generated based on the dialog flow. The nodes include the metadata extracted from the corresponding blocks.

According to one embodiment, the dialog engine analyzes the extracted metadata and selects the nodes that are mapped to blocks of the dialog flow that are configured to advance the dialog/conversation forward. For example, the dialog engine selects nodes mapped to blocks that prompt for a parameter value, or prompt a choice of a branch path (i.e.

menu option). This may be automatically accomplished via an extraction model that is initially trained with a training set of <dialogs, entities>. The extraction model may be invoked at each turn of the dialog to compute a probability that the encountered entity is one that is intended to obtain a parameter value or choose a branch path. According to this embodiment, those blocks of the dialog flow that are not needed to advance the dialog forward (e.g. a block that does an API call to a backend system), are not mapped to a node of the goal classification tree.

In act 806, the dialog engine evaluates the hierarchy of the nodes of the goal classification tree, and any node of the tree with only a single child is merged into a parent node, as no disambiguation is necessary for such a node in progressing the dialog forward. Metadata, such as prompts from the merged and merging nodes, are kept as merged metadata.

In act 808, the dialog engine defines the goal classification tree with the defined nodes.

In act 810, the dialog engine identifies and extracts the node schemas for generating corresponding frames (e.g. the frames 304 of FIG. 3) with the corresponding parameters or slots. The schema may include, for example, a name of the frame and the corresponding set of parameters or slots included in the frame. According to one embodiment, a subset of the nodes of the goal classification tree that are deemed to be intent/goal nodes (e.g all leaf nodes of the tree) are mapped to the frames in the model.

In act 812, the dialog tree builds a schema graph based on the relationships between the various frames. According to one embodiment, frames are associated by "is_a", and "has_a" relations. Frames that are linked via a "is_a" relation represent a grouping structure over a set of disjoint intents. According to one embodiment, these are compiled into a single multi-class intent classifier. Frames linked via a "has_a" relation are not joined together in a single classifier since they imply an additional frame rather than a refinement.

In act 814, the domain is then defined with the nodes, goal-clarification tree, and schemas.

In one embodiment, each of the various servers, controllers, switches, gateways, engines, and/or modules (collectively referred to as servers) in the afore-described figures are implemented via hardware or firmware (e.g. ASIC) as will be appreciated by a person of skill in the art.

In one embodiment, each of the various servers, controllers, engines, and/or modules (collectively referred to as servers) in the afore-described figures may be a process or thread, running on one or more processors, in one or more computing devices 1500 (e.g., FIG. 9A, FIG. 9B), executing computer program instructions and interacting with other system components for performing the various functionalities described herein. The computer program instructions are stored in a memory which may be implemented in a computing device using a standard memory device, such as, for example, a Random Access Memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 9A:
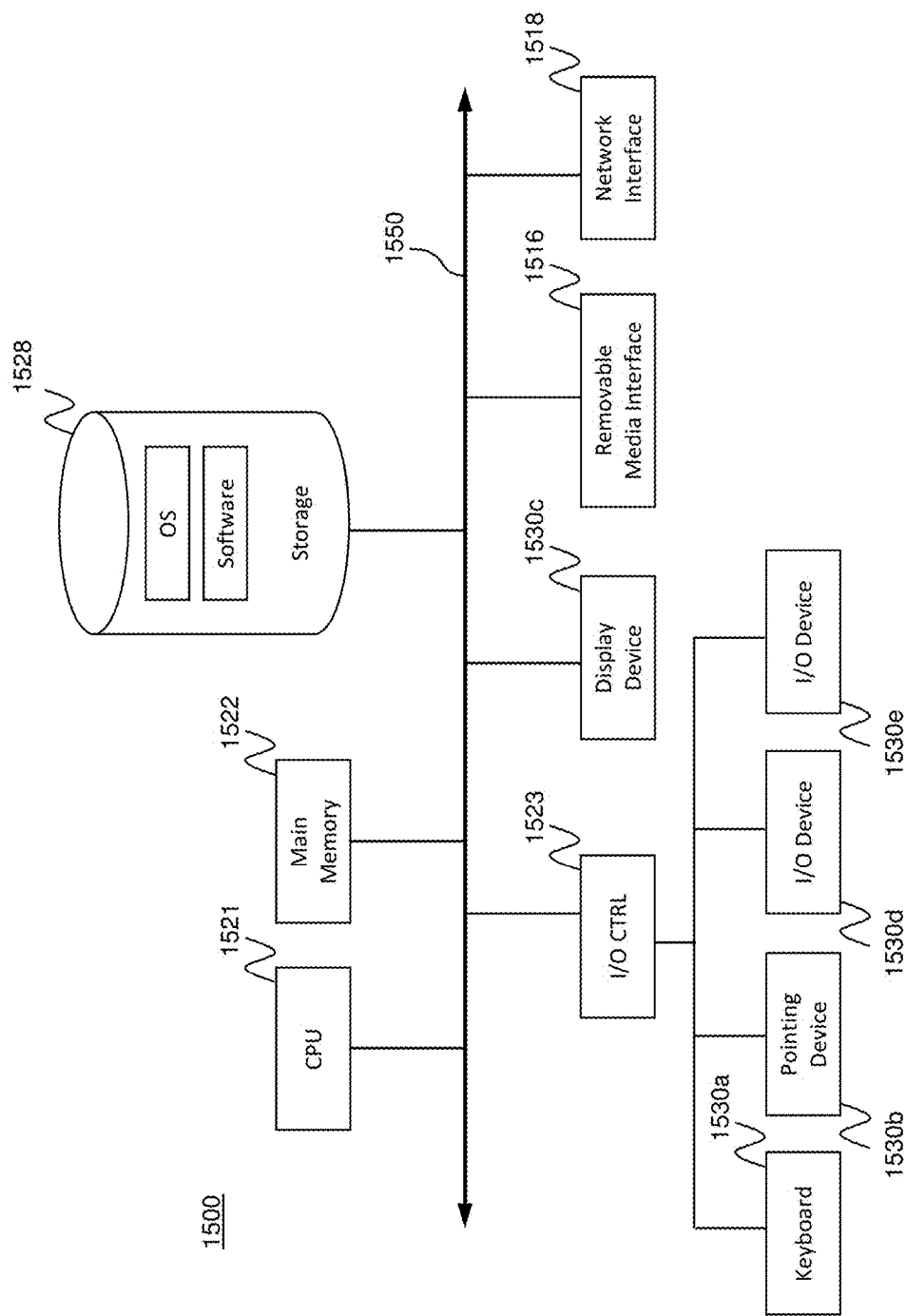
FIG. 9A is a block diagram of a computing device according to an embodiment of the present invention.

FIG. 9A and FIG. 9B depict block diagrams of a computing device 1500 as may be employed in exemplary embodiments of the present invention. Each computing device 1500 includes a central processing unit 1521 and a main memory unit 1522. As shown in FIG. 9A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 9B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 9A, the central processing unit 1521 communicates with the main memory 1522 via a system bus 1550. As shown in FIG. 9B, the central processing unit 1521 may also communicate directly with the main memory 1522 via a memory port 1503.

FIG. 9B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 9A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 9B depicts an embodiment of a computer 1500 in which the central processing unit 1521 communicates directly with I/O device 1530e. FIG. 9B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 9A, may control the I/O devices. The I/O controller may control one or more I/O devices such as a keyboard 1530a and a pointing device 1530b, e.g., a mouse or optical pen.

Referring again to FIG. 9A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connect or otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 9A and FIG. 9B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

As shown in FIG. 9C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 9D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 9E:
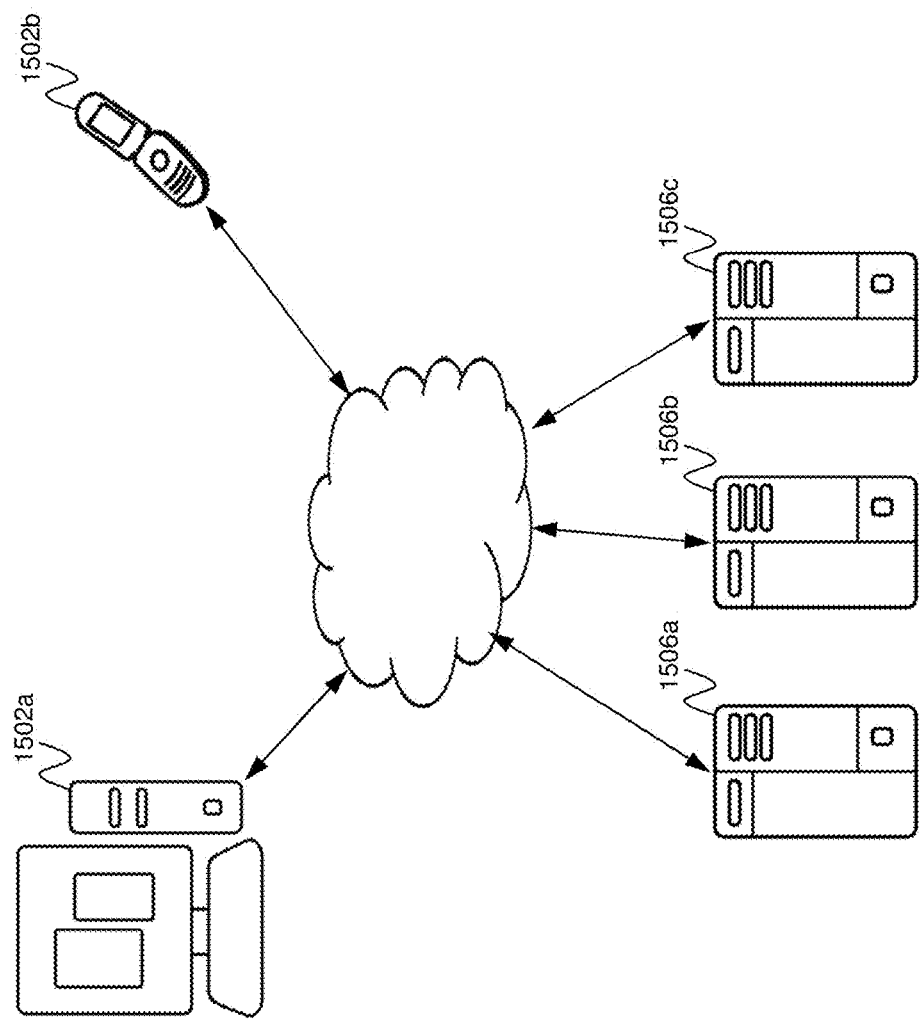
FIG. 9E is a block diagram of a network environment including several computing devices according to an embodiment of the present invention.

A computing device may be one of a plurality of machines connected by a network, or it may comprise a plurality of machines so connected. FIG. 9E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 9E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 9E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization are also contemplated, such as, for example, the network (e.g. via Software Defined Networking (SDN)). Functions, such as functions of the session border controller and other types of functions, may also be virtualized, such as, for example, via Network Functions Virtualization (NFV).

Although this invention has been described in certain specific embodiments, those skilled in the art will have no difficulty devising variations to the described embodiments which in no way depart from the scope and spirit of the present invention. Furthermore, to those skilled in the various arts, the invention itself herein will suggest solutions to other tasks and adaptations for other applications. For example, although the above embodiments have mainly been described in terms of routing inbound interactions, a person of skill in the art should appreciate that the embodiments may also be applied during an outbound campaign to select outbound calls/customers to which an agent is to be assigned. Thus, for example, the agent rating module 102 may rate customers based on their profiles and assign a specific agent to one of the calls/customers that is expected to maximize a reward (e.g. sales). Thus, the present embodiments of the invention should be considered in all respects as illustrative and not restrictive.

The invention claimed is:

1. A method for automatically extracting and using a domain model for conducting an automated dialog with a user, the method comprising:

reading, by a processor, a specification for a dialog flow from a data storage device, the dialog flow having a plurality of blocks organized in a hierarchical structure;

extracting, by the processor, metadata from each of the plurality of blocks;

selecting, by the processor, based on the extracted metadata, blocks of the plurality of blocks of the dialog flow that are configured to advance a dialog controlled by the dialog flow, wherein a block configured to advance the dialog is defined as one that either prompts for a parameter value or prompts a choice between a branching path; and defining, by the processor, nodes of the domain model based on the selected blocks of the plurality of blocks, wherein the nodes of the domain model are organized in a hierarchical structure including a leaf node and non-leaf node, wherein the leaf node is mapped to a data structure for storing data indicative of an intent of a user;

concurrently traversing, by the processor, the nodes of the domain model and the blocks of the plurality of blocks of the dialog flow for determining the intent of the user and for storing the data indicative of the intent in the data structure; and automatically invoking, by the processor, an action based on the determined intent;

wherein the concurrently traversing the nodes of the domain model and the blocks of the plurality of blocks of the dialog flow for determining the intent of the user further includes:

receiving, by the processor, a first action from the user in response to a first prompt provided to the user based on a previous block of the plurality of blocks;

providing, by the processor, a second prompt to the user based on a current block of the plurality of blocks;

receiving, by the processor, a second action from the user in response to the second prompt;

computing, by the processor, a probability for each of the nodes of the domain model, each of the nodes representing an intent;

selecting, by the processor, a particular node of the plurality of nodes based on the computed probabilities;

identifying, by the processor, a target block of the dialog flow corresponding to the particular node; and outputting, by the processor, a response to the user based on the identified target block;

wherein the target block is associated with the node of the plurality of nodes having a highest probability of the computed probabilities;
wherein the computing the probability for each of the nodes of the domain model comprises computing the probability based on both:
a current probability that is computed based on the second action received from the user; and
a prior probability that is computed based on the first action received from the user.

2. The method of claim 1, wherein each of the nodes is associated with one or more parameters, wherein values of the one or more parameters are identified in response to traversing the nodes of the domain model and the blocks of the plurality of blocks of the dialog flow.

3. The method of claim 1, wherein the target block is a block hierarchically below an intermediate block on a path from the current block to the target block, wherein the intermediate block is skipped during the dialog in response to identifying the target block.

4. The method of claim 1, wherein the first and second actions each comprises a natural language utterance from the user.

5. The method of claim 1, wherein an algorithm for computing the probability for each of the nodes of the domain model comprises:

$$\text{probability} = 1 - (1 - \text{prior probability}) * (1 - \text{current probability}).$$

6. The method of claim 5, wherein the response is a third prompt for disambiguating between a plurality of candidate intents.

7. The method of claim 6, further comprising:
receiving, by the processor, a third action from the user in response to the third prompt; and
identifying, by the processor, the intent from among the plurality of candidate intents based on the third action received from the user.

8. The method of claim 6, wherein the third prompt changes based on the computed probability of a target node of the nodes corresponding to the target block, relative to a threshold associated with the target node.

9. The method of claim 8, wherein the threshold is dynamically updated based on the third action received from the user in response to the third prompt.

* * * * *